United States Patent [19]

Koster et al.

[11] Patent Number: 5,627,248
[45] Date of Patent: May 6, 1997

[54] DIFUNCTIONAL LIVING FREE RADICAL POLYMERIZATION INITIATORS

[75] Inventors: Robert A. Koster; Duane B. Priddy; Irene Li, all of Midland, Mich.

[73] Assignee: The Dow Chemical Company, Midland, Mich.

[21] Appl. No.: 533,799

[22] Filed: Sep. 26, 1995

[51] Int. Cl.$^6$ .............. C08F 2/00; C08F 220/10; C08F 12/08; B01J 31/06
[52] U.S. Cl. .............. 526/217; 526/204; 526/328.5; 526/346; 526/340; 526/342; 502/159
[58] Field of Search .............. 526/217, 204, 526/328.5, 340, 342, 346; 502/159

[56] References Cited

U.S. PATENT DOCUMENTS

| | | |
|---|---|---|
| 4,581,429 | 4/1986 | Solomon et al. |
| 5,051,511 | 9/1991 | Seltzer et al. |
| 5,140,081 | 8/1992 | Seltzer et al. |
| 5,145,893 | 9/1992 | Galbo et al. |
| 5,204,422 | 4/1993 | Seltzer et al. |
| 5,312,871 | 5/1994 | Mardare et al. |
| 5,322,912 | 6/1994 | Georges et al. |
| 5,401,804 | 3/1995 | Georges et al. |
| 5,412,047 | 5/1995 | Georges et al. |
| 5,498,679 | 3/1996 | Moffiat et al. .............. 526/204 |

OTHER PUBLICATIONS

J. Org. Chem. (1992) 57(3), 982–988.
J. Am. Chem. Soc. 1994, 116, 11185–11186 (Craig H. Hawker).
Polymer Preprints, Synthesis, Characterization, and Evaluation of Initiators for Living Free Radical Polymerization: Synthesis of Polystyrene w/Controlled Structure vol. 36, No. 1, Apr. 1995.
Chemistry in Australia, Jan.–Feb. 1987, p. 32 (Ezio Rizzardo).
Macromolecules 1995, 28, 4391–4398, Veregin, et al.
J. Org. Chem. vol. 40, No. 23, 1975, pp. 3448–3450.
Macromolecules, 1993, 26, pp. 2987–2988.
Makromol. Chem. Rapid commun. 3, 533–536 (1982), Moad et al.
Angew. Chem. Int. Ed. Engl. 1995, 34, No. 13/14, pp. 1456–1459, (Hawker).

*Primary Examiner*—Joseph L. Schofer
*Assistant Examiner*—Wu C. Cheng

[57] ABSTRACT

A living free-radical polymerization process for preparing polymers from vinyl aromatic monomers comprising polymerizing the vinyl aromatic monomer in the presence of a difunctional nitroxyl initiator.

15 Claims, No Drawings

DIFUNCTIONAL LIVING FREE RADICAL POLYMERIZATION INITIATORS

BACKGROUND OF THE INVENTION

This invention relates to a living free radical polymerization process.

A process for producing low polydispersity polymers by free-radical chemistry using a living polymerization is disclosed in *Macromolecules* 1993, 26, 2987, by Georges et.al. However, this process utilizes monofunctional initiators and reports reaction times of 21 hours or more.

Another method of preparing low polydispersity vinyl aromatic polymers having accurate molecular weight control and block copolymer formation, giving rise to well-defined end groups, is disclosed in *J. Am. Chem. Soc.* 1994, 116, 11185–11186, by Hawker using a monofunctional nitroxyl initiator. However, long reaction times, e.g. 72 hours, are again required to reach a desirable conversion.

It would be highly desirable to utilize the control of the living free radical polymerization to produce high molecular weight vinyl aromatic polymers within shorter reaction times and produce block copolymers in a more efficient manner.

SUMMARY OF THE INVENTION

The present invention is a living free-radical polymerization process for preparing polymers from vinyl aromatic monomers comprising polymerizing the vinyl aromatic monomer in the presence of a difunctional nitroxyl initiator.

A second aspect of the present invention is a difunctional nitroxyl initiator which is a telechelic polymer macroinitiator comprising a polymer having nitroxyl functionalized chain-ends.

These initiators are especially useful in a process for preparing triblock copolymers such as polystyrene-polyacrylate-polystyrene copolymers which are useful as adhesives and as compatibilizers for polymer blends, and polybutadiene triblock copolymers such as styrene/acrylonitrile-polybutadienestyrene/acrylonitrile and polystyrene-polybutadiene-polystyrene block copolymers, which are especially useful as polymer toughening agents.

DETAILED DESCRIPTION

Suitable monomers used in the process of the present invention include vinyl aromatic monomers typically represented by the formula:

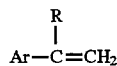

wherein R is hydrogen or methyl, Ar an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl with phenyl being most preferred. Typical vinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include but are not limited to acrylic monomers such as acrylonitrile, methacrylonitrile, methacrylic acid, methyl methacrylate, butyl acrylate, acrylic acid, and methyl acrylate, maleic anhydride, maleimide, and phenylmaleimide. In addition, the polymerization may be conducted in the presence of predissolved elastomer to prepare impact modified, or grafted rubber containing products, examples of which are described in U.S. Pat. NoS. 3,123,655, 3,346,520, 3,639, 522, and 4,409,369.

Difunctional nitroxyl initiators useful in the process of the present invention, include any dinitroxyl compound which will initiate living free radical polymerization, wherein polymer chain growth occurs between the two nitroxyl groups, and produce a telechelic polymer. A telechelic polymer is a polymer having two functionalized chain-ends as described in "Telechelic Polymers", *Encycopedia of Polymer Science and Engineering*, 1989, Vol. 16, pages 494–532. Preferably, the difunctional nitroxyl initiators are of the formula:

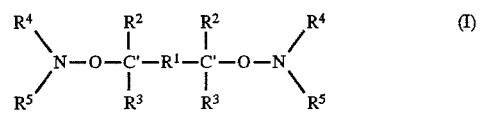

wherein $R^1$ is a linking group, $R^2$ and $R^3$ are each independently H, alkyl, cycloalkyl, an activating group, or together form an alkyl bridging group, R4 and R5 are each independently alkyl, aryl, or together form an optionally alkyl substituted ring wherein the ring contains from about 4 to 10 carbon atoms such as a 2,2,6, 6-tetramethyl-1-piperidinyl group, with the proviso that each C' is attached to at least one activating group.

Any alkyl group is defined as a group containing from 1 to 6 carbon atoms, and any aryl group as containing 1–3 aromatic rings. An activating group is defined as a group wherein the point of attachment must be a carbon atom which is unsaturated or aromatic, such as an alkenyl, cyano, carboxyl or aryl group. An alkyl bridging group is defined as a divalent alkyl group which is attached to both C' atoms.

$R^1$ can be any linking group, as long as C' is attached to at least one activating group. It may be saturated or unsaturated, and contain non-carbon atoms, including but not limited to sulfur, nitrogen and/or oxygen. Typical linking groups include alkylene, cycloalkylene and phenylene groups. Alkylene is defined as a bivalent hydrocarbon group, cycloalkylene as a bivalent cyclic hydrocarbon group, and arylene as a bivalent aryl group.

In some instances it is advantageous for the linking group to contain a functional group capable of initiating normal free radical polymerization at a temperature below the nitroxyl activation temperature. The nitroxyl activation temperature is defined as a temperature at which living free radical polymerization occurs at a reasonable rate. Typically, this occurs at temperatures above about 120 ° C., preferably between about 120° and 170° C. Such groups include azo, disulfide or peroxide functionalities.

In other cases it is advantageous for the linking group to contain a C=C bond capable of undergoing addition-fragmentation chain transfer.

In yet other instances, it is advantageous for the linking group to contain both a functional group capable of initiating normal free radical polymerization at a temperature below the nitroxyl activation temperature and a C=C bond capable of undergoing addition-fragmentation chain transfer.

Preferably, $R_1$ is arylene and $R_2$ and $R_3$ are not both H, more preferably $R_1$ is arylene, $R_2$ is methyl and $R_3$ is H, and most preferably $R_1$ is arylene, $R_2$ is methyl, $R_3$ is H and $R_4$ and $R_5$ together form a 2,2,6,6-tetramethyl-1-piperidinyl group.

In another embodiment of the present invention, the difunctional nitroxyl initiator is a telechelic polymer macroinitiator, such as a polybutadiene, polyacrylate or polycarbonate having nitroxyl functionalized chain-ends.

Examples of difunctional nitroxyl initiators include but are not limited to:

Azo Initiators

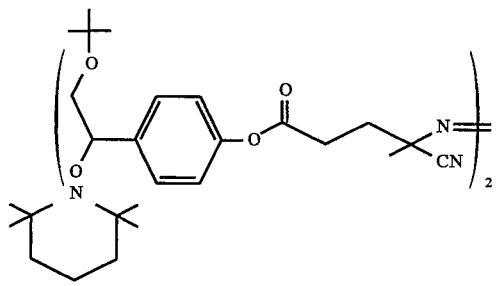
(1)

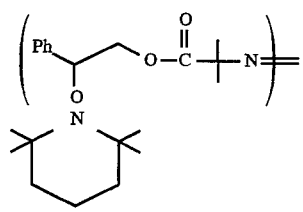
(2)

Disulfide Initiators

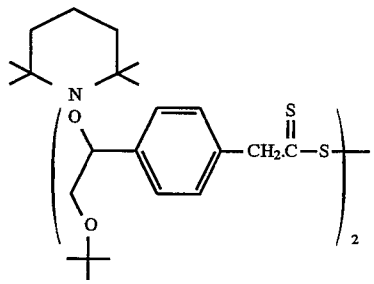
(3)

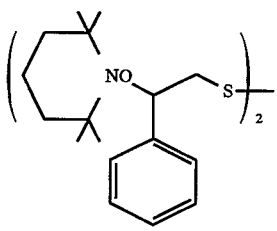
(4)

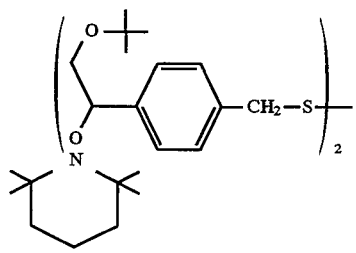
(5)

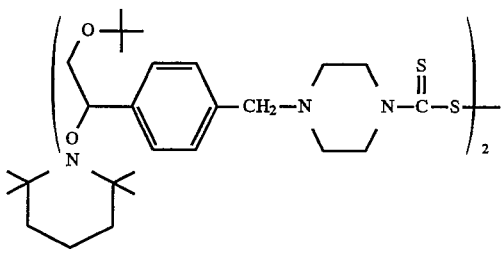
(6)

Peroxide Initiators

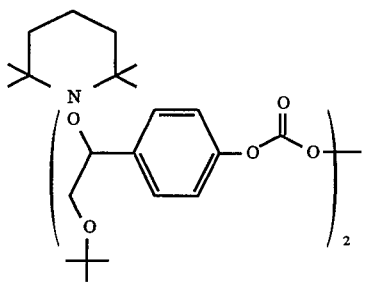
(7)

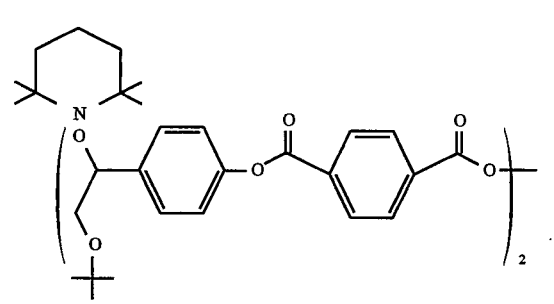
(8)

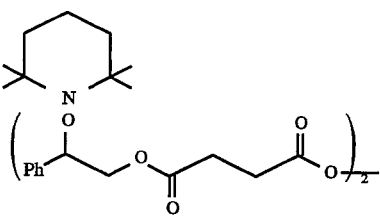
(9)

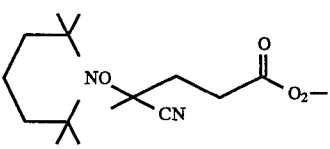
(10)

Addition-Fragmentation Chain Transfer Agents

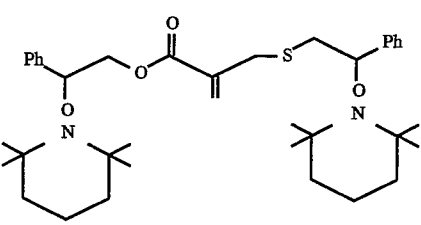
(11)

(12)
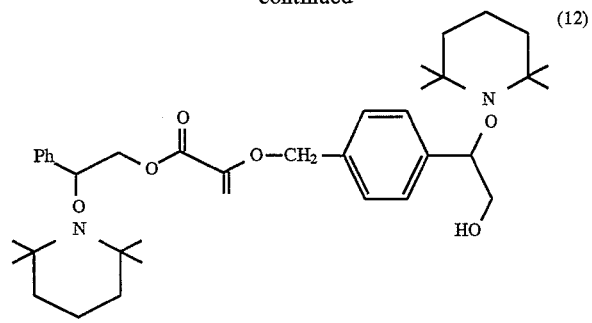
(13)
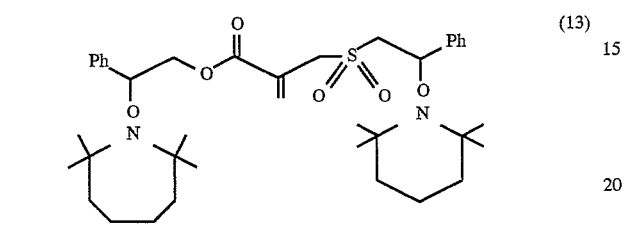
(14)
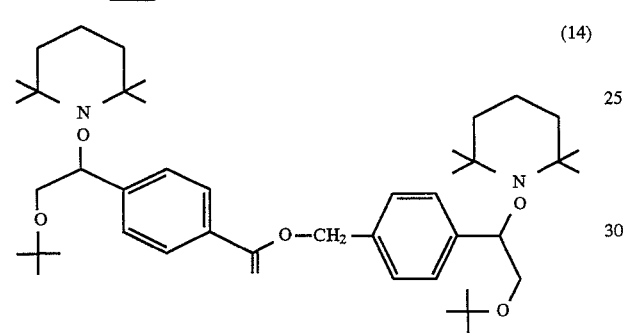
Other Dinitroxides
(15)
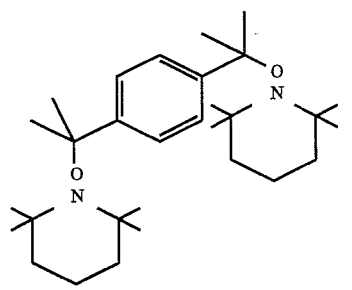
(16)
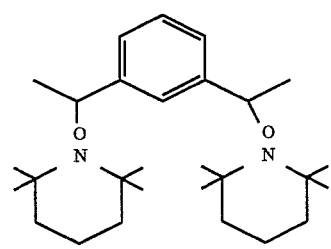
(17)
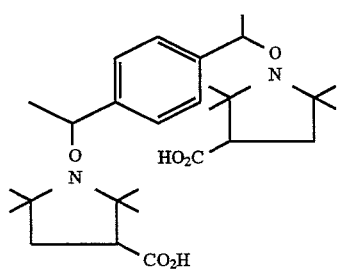
(18)
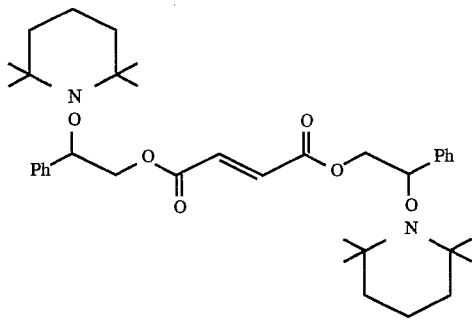
(19)
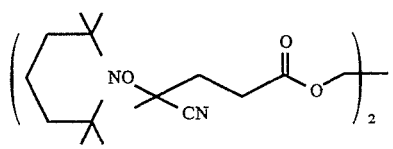
(20)
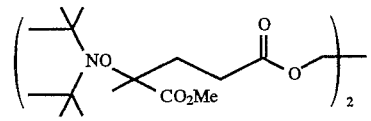
(21)
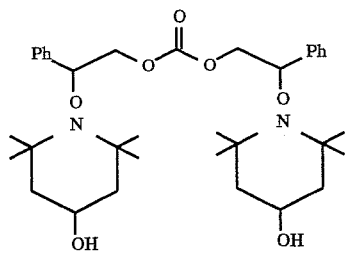
(22)
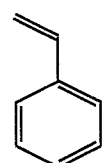
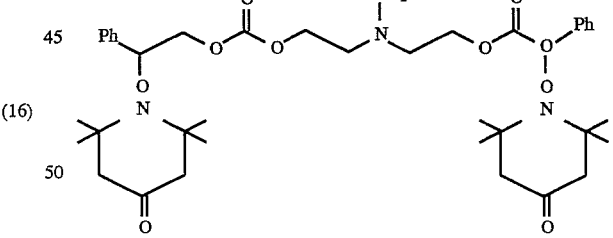
(23)
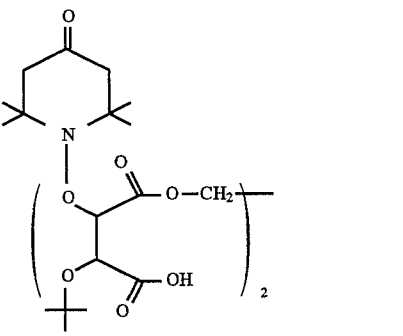

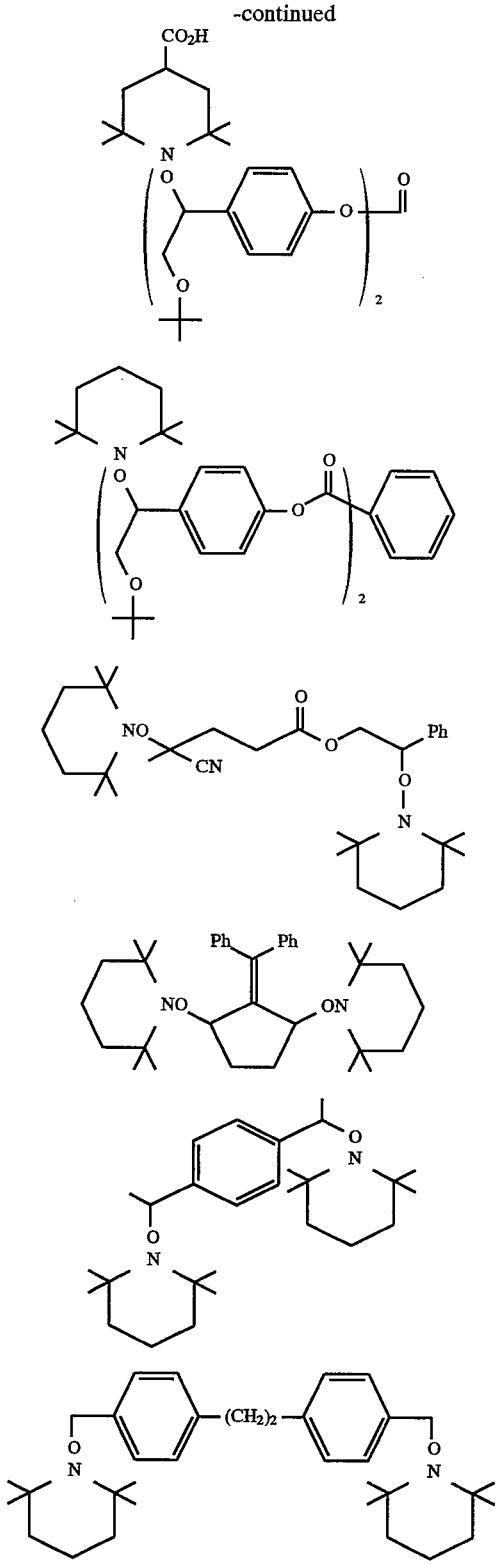

These difunctional nitroxyl initiators can be prepared from the desired precursors, such as C'—R¹—C' containing compounds, by forming radicals in the presence of a nitroxyl containing compound which traps the radical intermediates as they form. Methods of making radicals are well known in the art and include techniques such as 1) H-abstraction from activated hydrogen compounds as discussed in *ACS Polym. Prepr.* 1995, 36, 469 by I. Li, B. A. Howell; A. Ellaboudy; P. Kastl; and D. B. Priddy; 2) radical addition to activated double bonds as discussed in *Macromolecules* 1993, 26, 2987 by M. K. Georges, R. P. N. Veregin, P. M. Kazmaier, and G. K. Hamer; 3) electron transfer as disclosed in *J. Organic Chemistry* 1975, 40, 3448 by G. M. Whitesides and T. L. Newirth; and 4) thermolysis of an activated azo compound as discussed in U.S. Pat. No. 4,581,429 by Solomon et al., EP-304756 by Solomon et al., and *Chemistry in Australia*, Jan-Feb 1987, 32, by E. Rizzardo.

In one embodiment, dinitroxyl compounds are made by forming diradicals in the presence of a nitroxyl containing compound. Diradicals can be formed from radical precursors, such as compounds containing two vinyl groups, two labile H atoms capable of being abstracted, two halogen atoms capable of electron transfer, or a cyclic azo containing compound. The nitroxyl containing compound can be any nitroxyl containing compound capable of trapping radicals.

In another method, monoradicals are formed from radical precursors such as those having only one vinyl group, one labile H capable of being abstracted, or one halogen capable of electron transfer. However, these precursors also contain a functional group, such as a hydroxyl or acid functional group, which is capable of being coupled with another monoradical. In this method, the monoradical is formed in the presence of the nitroxyl containing compound to form a mononitroxyl adduct which is then coupled to form the difunctional nitroxyl initiator such as compound (26).

In another embodiment, wherein the difunctional nitroxyl initiator is a telechelic polymer macroinitiator, a difunctional nitroxyl initiator of Formula I, containing a functional group capable of initiating normal free radical polymerization at a temperature below the nitroxyl activation temperature, is used to initiate normal free radical polymerization of a monomer, e.g. butadiene, isoprene, or butylacrylate, to produce a polymer having nitroxyl functionalized chain-ends. When the polymer is a polycarbonate, the polycarbonate is made using a conventional polycarbonate polymerization process, e.g. interfacial polymerization, using a nitroxy functional phenol as molecular weight regulator, or end-capping agent, to produce a polycarbonate polymer having nitroxyl functionalized chain-ends. A nitroxyl functional phenol can be made, for example, by reacting para-acetoxystyrene with tert-butylperoxide in the presence of 2,2,6, 6,-Tetramethylpiperidinyl-1-oxy (TEMPO) and subsequently hydrolyzing the acetoxy groups.

The amount of difunctional nitroxyl initiator used in the process of the present invention is dependent upon the desired weight average molecular weight (Mw) of the polymer to be produced. The more initiator that is added, the lower the Mw of the polymer produced. Typically, the initiator is present in amounts of from about 0.001 to about 5 mole percent based on the moles of monomer. Preferably, the initiator is present in amounts of from about 0.01 to about 5, more preferably from about 0.05 to about 4.5, and most preferably from about 0.1 to about 4 mole percent based on the moles of monomer.

In the process of the present invention, the difunctional nitroxyl compound is typically dissolved in monomer and added in the initial feed.

Living free radical polymerization is defined as a polymerization process wherein chain initiation and chain propagation occur without significant chain termination reactions. Each initiator molecule produces a growing monomer chain which continuously propagates until all the available monomer has been reacted. Living free radical polymerization differs from conventional free radical polymerizations where chain initiation, chain propagation and chain termination reactions occur simultaneously and polymerization continues until the initiator is consumed.

In one embodiment of the present invention, difunctional nitroxyl initiators are used to initiate sequential living free radical polymerization of two different monomers as depicted by:

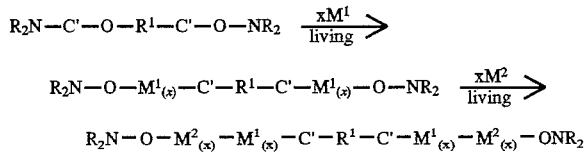

wherein $M^1$ and $M^2$ are different monomers. In this case, $R^1$ can be any linking group which does not initiate free radical polymerization at temperatures below the nitroxyl activation temperature, provided that C' is attached to at least one activating group.

In another embodiment of the present invention, difunctional nitroxyl initiators or iniferters, which are molecules which act as initiators, chain transfer agents and terminators, as described in *Makromol. Chem., Rapid Commun* 1982, 3, 127–32 by T. Otsu and M. Yoshida, are used to initiate polymerization of one monomer, using conventional free radical polymerization techniques at a temperature below the nitroxyl activation temperature, followed by polymerization of a second monomer, using living free radical polymerization at a temperature greater than the nitroxyl activation temperature, as depicted by:

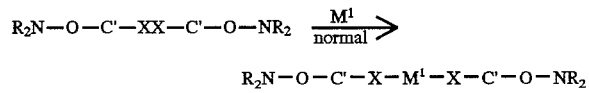

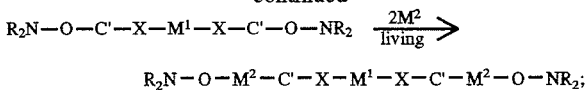

wherein XX is a linkage that separates to form free radicals at a temperature below the nitroxyl activation temperature, and $M^1$ and $M^2$ are different monomers. In this case XX is used to designate $R^1$, which was used previously, to show that the insertion of $M^1$ occurs between the free radicals which form. Typical functionalities capable of separating to form free radicals are disulfide compounds.

In another embodiment, addition-fragmentation chain transfer, as described in W08804304, by E. Rizzardo et al, occurs followed by living polymerization, as depicted by:

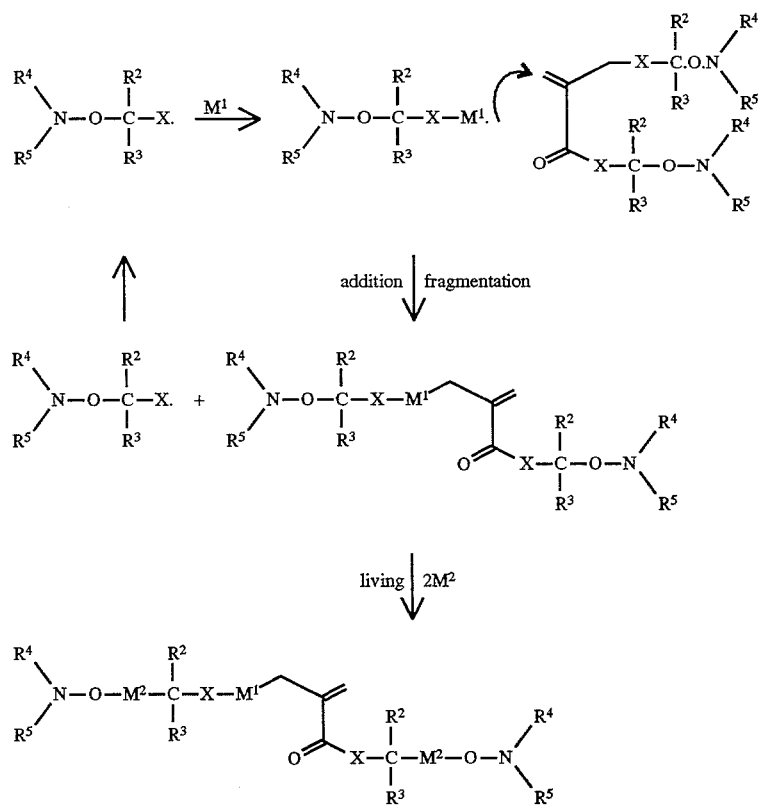

The initial radical can be generated by spontaneous generation at temperatures above 100° C. or can be generated at temperatures under 100° C. by the addition of a small amount of free radical initiator. In this case, $R^1$ of the present invention is represented by X—C—C(=C)—C(=O)—X.

The living free radical polymerization process of the present invention may be performed in a variety of media including suspension, emulsion, bulk, and aqueous or non-aqueous solution. Conditions for such polymerization processes are well known in the art. Preferably, the process is a continuous bulk solution process.

The living polymerization is typically conducted at a temperature of from about 120° to about 170° C., preferably from about 125 to about 165° C., more preferably from about 130° to about 160° C. and most preferably from about 135° to about 150° C. At temperatures above 170° C., the living chain ends of the polymer decompose and cause termination of the living polymerization.

However, in some embodiments of the present invention, normal free radical polymerization precedes the free radical living polymerization at temperatures below about 120° C., preferably at temperatures from about 60° to about 120° C.

When normal free radical polymerization occurs prior to living free radical polymerization, a telechelic polymer macroinitiator is formed having nitroxyl functionalized chain-ends. This polymer is then used to initiate living free radical polymerization of a vinyl aromatic monomer and becomes a center block in the formation of a triblock copolymer.

The living polymerization is typically conducted for a sufficient amount of time, such that the desired conversion is achieved. The amount of time needed is dependent upon the temperature of the polymerization. The lower the temperature, the longer the amount of time needed to achieve a desired conversion. Typically, the polymerization is conducted from about 1 to about 20 hours, preferably from about 1.5 to about 10 hours, more preferably from about 2 to about 8 hours and most preferably from about 2.5 to about 6 hours.

The polymer produced by the process of the present invention can have a variety of molecular weights, which is dependent upon the amount of dinitroxyl initiator used. The amount of dinitroxyl initiator used in the process of the present invention, will determine how many chains are initiated, with fewer chains producing higher molecular weight polymer. Typically, the Mw of the polymer produced by the process of the present invention will be from about 5,000 to about 200,000, preferably from about 5,000 to about 175,000, more preferably from about 7,000 to about 150,000, and most preferably from about 10,000 to about 100,000.

The process of the present invention is particularly advantageous in preparing block copolymers of vinyl aromatic monomers, specifically ABA triblock copolymers. The comonomers which may be used in preparing such block copolymers include diene monomers such as conjugated dienes, preferably 1,3-butadiene and isoprene, (meth) acrylates and mixtures thereof.

For example, to produce an ABA triblock copolymer, a difunctional nitroxyl initiator is dissolved in monomer B to form a reaction liquid which is polymerized and forms a telechelic polymer macroinitiator, containing two nitroxyl end groups on the polymer chain. The macroinitiator is then contacted with monomer A to form a second reaction liquid which is polymerized to form an ABA triblock copolymer.

All difunctional nitroxyl initiators capable of producing telechelic polymers are useful for making A-B-A triblock copolymers, however dinitroxyl azo, disulfide, peroxide initiators and dinitroxyl addition-fragmentation chain transfer agents are especially useful for making triblock copolymers containing polyacrylates and polybutadienes.

Acrylates do not polymerize well using nitroxide initiation as discussed in U.S. Pat. No. 5,412,047 by Georges et al. However, this problem is overcome by the process of the present invention. An acrylate center block can be prepared by initiating polymerization of an acrylate using a nitroxyl azo, disulfide, or peroxide initiator at a temperature below the nitroxyl activation temperature, e.g. (<120° C.), to produce a telechelic polyacrylate macroinitiator having nitroxyl functionalized chain-ends. Additionally, the macroinitiator can be prepared by initiating polymerization using any azo, disulfide, or peroxide initiator in the presence of a dinitroxyl addition-fragmentation chain transfer agent at a temperature below the nitroxyl activation temperature to make a polyacrylate having nitroxyl functionalized chain-ends. The polyacrylate is then dissolved in the desired A monomer and heated above the nitroxyl activation temperature to initiate living free radical polymerization resulting in the formation of an A-B-A triblock copolymer.

In another embodiment of the present invention, styrene-acrylonitrile/polybutadiene block copolymers can be made similarly under emulsion polymerization conditions. A polybutadiene center block can be prepared by initiating polymerization of butadiene using the same process as described above in polymerizing acrylates, to form a telechelic polybutadiene macroinitiator having nitroxyl functionalized chain-ends. The polybutadiene can then be heated to a temperature above the nitroxyl activation temperature in the presence of styrene and acrylonitrile monomers to initiate living free radical polymerization and form styrene-acrylonitrile/polybutadiene block copolymers. The living free radical polymerization can be conducted under emulsion polymerization conditions wherein the styrene and acrylonitrile monomers are added to the polybutadiene emulsion, or alternatively, bulk polymerization conditions can be used wherein the polybutadiene is coagulated, filtered, dried and dissolved in styrene and/or acrylonitrile monomer before initiating living free radical polymerization.

The following examples are provided to illustrate the present invention. The examples are not intended to limit the scope of the present invention and they should not be so interpreted. Amounts are in weight parts or weight percentages unless otherwise indicated.

Synthesis of TEMPO adduct of Ethylbenzene

A 100 mL, three-necked flask equipped with a condenser, nitrogen inlet, and magnetic stirrer is flushed with nitrogen and charged with 30 mL ethylbenzene (EB) and di-t-butylperoxide (DtBP) (1.46 g, 10 mmole). 2,2,6,6-Tetramethylpiperidinyl-1-oxy (TEMPO) (3.12 g, 20 mmole) is added and the mixture refluxed under nitrogen for 24 h. The excess EB is removed using a rotary evaporator. The oil which remains is purified using preparative HPLC to give a light yellow oil which is added to ethanol and crystallized by cooling in dry ice. The slightly yellow crystals are recrystallized from ethanol until white (mp=45° C.). NMR analysis shows that the compound is the monofunctional nitroxyl compound, 2,2,6,6-tetramethyl-1-(1-phenylethoxy) piperidine (TMPEP).

EXAMPLE 1

Synthesis of Di-TEMPO Adduct of p-Cyclophane

P-Xylylidene is generated by the high temp (600° C.), low pressure (0.05 mm Hg) pyrolysis of p-cyclophane and is trapped in a cold (−80° C.) toluene solution containing TEMPO. As the solution warms to room temperature it forms the 2:2 adduct of xylylene and TEMPO, 1,1'-(1,2-ethanediylbis(4,1-phenylenemethylene)oxy)bis(2,2,6, 6tetramethylpiperidine). The structure is confirmed by NMR and mass spectrometry.

EXAMPLE 2

Synthesis of Di-TEMPO Adduct of 1,4-Diethylbenzene

A 50 mL, 3-necked flask equipped with a condenser, nitrogen inlet, dropping funnel and magnetic stirrer is flushed with nitrogen and charged with 5.36 g (0.04 mol) 1,4-diethylbenzene and 12.48 g (0.08 mol) TEMPO. The mixture is stirred until homogeneous. Then 8.76 g (0.06 mol) di-t-butylperoxide is added and the mixture kept at 110° C. for 2 days using an oil bath. The mixture is then poured into 120 mL of acetonitrile and left standing until white crystals form. The crystals are removed by filtration and recrystallized from acetonitrile (mp=155° C.). NMR and mass spectral analyses show the compound to be 1,1'-(1,4-phenylenebis(ethylideneoxy))bis(2,2,6,6-tetramethylpiperidine).

EXAMPLE 3

Styrene Polymerization 1,1'-(1,4-phenylenebis(ethylideneoxy))bis(2,2,6,6-tetramethylpiperidine) (Di-TEMPO Adduct of 1,4-Diethyl-benzene)(0.1066 g, 24 moles of nitroxide groups) is dissolved in 20 g of styrene. Two ml of this solution is loaded into ⅜×12 inch glass ampoules, and sealed under vacuum using the freeze-thaw technique. The ampoules are heated in an oil bath at 140° C. for 15 minutes then removed, opened, and the contents used to determine percent conversion to polystyrene by gravimetric analysis (polymer syrup was flash evaporated at 215° C./5 mm Hg for 15 minutes). Weight average (Mw) and number average (Mn) molecular weights are determined using gel permeation chromatography (GPC).

EXAMPLE 4

The same procedure as in Example 3 is followed except that 1, 1'-(1,2-ethanediylbis(4,1-phenylenemethylene)oxy)bis(2,2,6,6-tetramethylpiperidine) (Di-TEMPO Adduct of p-Cyclophane)(0.1248 g, 24 mmoles of nitroxide groups) is used in place of 1,1'-(1,4-phenylenebis(ethylideneoxy)) bis (2,2,6,6-tetramethylpiperidine).

COMPARATIVE EXAMPLE

The same procedure as in Example 3 is followed except that 2,2,6,6-tetramethyl-1-(1-phenylethoxy)piperidine (mono-TEMPO adduct of Ethylbenzene)(0.1253 g, 24 mmoles of nitroxide groups) is used in place of 1,1'-(1,4-phenylenebis(ethylideneoxy))bis(2,2,6,6-tetramethylpiperidine).

The following table shows the results of using the indicated initiators at the same molar concentration of active nitroxide.

| Example | Initiator | Percent Styrene Conversion | Mw | Mn | Mw/Mn |
| --- | --- | --- | --- | --- | --- |
| Example 3 | Di-TEMPO Adduct of 1,4-Diethyl-benzene | 5.8 | 7600 | 5700 | 1.3 |
| Example 4 | Di-TEMPO Adduct of p-Cyclophane | 6.3 | 60,000 | 30,000 | 2.0 |
| Comparative | TEMPO adduct of Ethylbenzene | 3.7 | 5564 | 3630 | 1.5 |

The polymerizations of Examples 3 and 4 have higher conversion rates and Mw's over the comparative example and the polymerization of Example 3, using the Di-TEMPO Adduct of 1,4-Diethyl-benzene, has high conversion coupled with low polydispersity.

EXAMPLE 5

Preparation of an A-B-A Triblock Polymer Using Di-TEMPO Adduct of 1,4-Diethyl-benzene The polystyrene obtained from Example 3 using Di-TEMPO Adduct of 1,4-Diethyl-benzene(0.2 g) is dissolved in p-methylstyrene (4 g) and the mixture heated in an oil bath at 140° C. for 15 minutes, resulting in 7 percent monomer conversion. The polymer is isolated by pouring the resulting syrup into methanol. NMR analysis is consistent with a (poly-4-methylstyrene)-polystyrene-(poly-4-methylstyrene)polymer having an A-B-A triblock structure. GPC analysis shows that the triblock polymer has an Mn of 14,400 and a Mw of 18,100.

What is claimed is:

1. A living free-radical polymerization process for preparing telechelic polymers from vinyl aromatic monomers comprising polymerizing the vinyl aromatic monomer in the presence of a difunctional nitroxyl initiator.

2. The process of claim 1 wherein the difunctional nitroxyl initiator is of the formula:

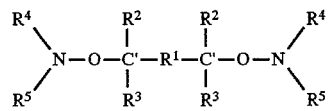

wherein $R^1$ is a linking group, $R^2$ and $R^3$ are each independently H, alkyl, cycloalkyl, an activating group, or an alkyl bridging group, $R_4$ and $R_5$ are each independently alkyl, aryl, or together form an optionally alkyl substituted ring wherein the ring contains from about 4 to 10 carbon atoms, with the proviso that C' is attached to at least one activating group.

3. The process of claim 2, wherein $R^1$ is a linking group containing a functional group capable of initiating free radical polymerization at a temperature below the nitroxyl activation temperature.

4. The process of claim 3 wherein $R^1$ is a linking group containing an azo, disulfide or peroxide group.

5. The process of claim 2 wherein $R^2$ is a linking group containing a C=C bond capable of undergoing addition-fragmentation chain transfer.

6. The process of claim 2 wherein $R^1$ is a linking group containing both a functional group capable of initiating free radical polymerization at a temperature below the nitroxyl activation temperature and a C=C bond capable of undergoing addition-fragmentation chain transfer.

7. The process of claim 2 wherein $R^1$ is an arylene group, $R^2$ is a methyl group, R3 is H, and $R^4$ and $R^5$ together form a 2,2,6,6-tetramethyl-1-piperidinyl group.

8. The process of claim 1 wherein the vinyl aromatic monomer is styrene.

9. The process of claim 1 wherein the difunctional nitroxyl initiator is a telechelic polymer macroinitiator.

10. The process of claim 9 wherein the telechelic polymer macroinitiator is a polyacrylate having nitroxyl functionalized chain-ends.

11. The process of claim 10 wherein a polystyrene-polyacrylatepolystyrene triblock copolymer is produced.

12. The process of claim 9 wherein the telechelic polymer macroinitiator is a polybutadiene having nitroxyl functionalized chain-ends.

13. The process of claim 12 wherein a polystyrene-acrylonitrile/polybutadiene/polystyrene-acrylonitrile triblock copolymer is produced.

14. A telechelic polymer macroinitiator comprising a polymer having nitroxyl functionalized chain-ends.

15. The macroinitiator of claim 14 Wherein the polymer is selected from the group consisting of polyacrylate, polybutadiene, polyisoprene and polycarbonate.

* * * * *